United States Patent [19]

Nagahara

[11] Patent Number: 5,339,450
[45] Date of Patent: Aug. 16, 1994

[54] COMPUTER SYSTEM INCLUDING A TERMINAL OPERABLE AS A SERVICE PROCESSOR AND A WORK STATION

[75] Inventor: Toyokazu Nagahara, Kawasaki, Japan

[73] Assignee: Fujitsu Limited, Kawasaki, Japan

[21] Appl. No.: 987,537

[22] Filed: Dec. 7, 1992

Related U.S. Application Data

[63] Continuation of Ser. No. 442,915, Nov. 28, 1989, abandoned.

[30] Foreign Application Priority Data

Dec. 2, 1988 [JP] Japan .................. 63-306343

[51] Int. Cl.⁵ ............................. G06F 11/00
[52] U.S. Cl. ........................ 395/700; 371/12; 371/15.1; 371/17; 364/280; 364/280.2; 364/280.3; 364/DIG. 1
[58] Field of Search ............ 395/800, 575, 700, 650, 395/325; 371/8, 9, 11, 12, 8.1, 8.2, 9.1, 11.1, 11.2, 11.3, 12, 13, 14, 15.1, 17

[56] References Cited

U.S. PATENT DOCUMENTS

| | | | |
|---|---|---|---|
| 4,268,902 | 5/1981 | Berglund et al. | 364/200 |
| 4,410,983 | 10/1983 | Cope | 371/8 |
| 4,441,162 | 4/1984 | Lillie | 395/425 |
| 4,453,216 | 6/1984 | Chiba et al. | 364/200 |
| 4,472,771 | 9/1984 | Bienvenu et al. | 364/200 |
| 4,626,986 | 12/1986 | Mori | 395/700 |
| 4,660,144 | 4/1987 | Walsh | 364/200 |
| 4,814,972 | 3/1989 | Winter et al. | 364/200 |
| 4,896,289 | 1/1990 | Svinicki et al. | 395/575 |
| 4,926,319 | 5/1990 | Wilkie et al. | 364/200 |
| 5,043,881 | 8/1991 | Hamazaki | 364/200 |

FOREIGN PATENT DOCUMENTS

| | | |
|---|---|---|
| 55088157 | 12/1978 | Japan . |
| 55-88157 | 8/1980 | Japan . |
| 59-173815 | 10/1984 | Japan . |
| 59-180734 | 10/1984 | Japan . |
| 60-217436 | 10/1985 | Japan . |
| 63-070346 | 9/1986 | Japan . |
| 63115241 | 10/1986 | Japan . |
| 62-3349 | 6/1987 | Japan . |

OTHER PUBLICATIONS

Patent Abstracts of Japan, vol. 4, No. 138 (P-29), Jul. 3, 1980.
Patent Abstracts of Japan, vol. 9, No. 40 (P-336), Oct. 13, 1984.
Patent Abstracts of Japan, vol. 10, No. 80 (P-441), Mar 29, 1986.
Patent Abstracts of Japan, vol. 12, No. 298 (P-744), Aug. 15, 1988.
Patent Abstracts of Japan, vol. 12, No. 366 (P-765), Sep. 30, 1988.

*Primary Examiner*—Alyssa H. Bowler
*Assistant Examiner*—Alpesh M. Shah
*Attorney, Agent, or Firm*—Staas & Halsey

[57] ABSTRACT

The present invention relates to a floating console control system of computer system. This computer system includes a main storage unit storing the operating system, a central processing unit for reading instructions of a program stored in the main storage unit and excuting programmed processing and calculations and a service processor connected to the main storage unit and central processing unit to load the program to the main storage unit. The service processor is connected to a plurality of terminals which are able to perform as both a service processor terminal and a work station terminal. The purality of terminals are assigned numbers and stored, in such a manner that the operating system is loaded to the main storage unit, when the plurality of terminal issues connection request to the service process. Thereafter, when a predetermined program for loading the operating system to the main storage unit is loaded, the number indicating the terminal which has issued such connection request is stored in the program. Thereafter the predetermined program loads the operating system to the main storage unit.

11 Claims, 6 Drawing Sheets

COMPUTER SYSTEM INCLUDING A TERMINAL OPERABLE AS A SERVICE PROCESSOR AND A WORK STATION

This application is a continuation of application Ser. No. 07/442,915, filed Nov. 28, 1989, now abandoned.

BACKGROUND OF THE INVENTION

1. Field of the Invention

The present invention relates to change-over of console terminals of service processor for fault detection and recovery, initial program loading of an information processing unit.

2. Background of the Related Art

A computer system comprising a central processing unit, a and main storage unit, a main storage control unit for accessing the main storage unit and a channel unit for controlling the input and output has been used for information processing and scientific calculation, etc.

A supercomputer to be installed in offices is connected with a service processor (hereinafter abbreviated as SVP). As described in the Japanese Patents of Laid-open Nos. 55-88157, 59-173815, 59-180734, the service processor conducts fault detection and recovery of the central processing unit, main storage unit and main storage control unit, for example, and follows the history or prior art of the instruction processings. Moreover, the service processor conducts the well known initial program loading as an important processing. The initial program loading means loads of necessary programs before the computer starts processing, but if the computer generates a system-down or system-failure due to a fault, it discontinues processing.

The service processor SVP is connected to a terminal unit for executing the intrinsic processing (e.g., fault detection and recovery, initial program loading) thereof, providing, a console and an operator is capable of inputting processing commands from this console. Moreover, an operating system (OS) stored in the main storage unit is tranferred to the central processing unit (CPU) and thereby the predetermined processing is executed by the computer system. The OS message is sometimes output to SVP from this operating system (OS). This operation is carried out by outputting the current condition of computer system to SVP.

In addition, SVP is sometimes connected with a plurality of work stations. The interface line is connected to SVP through an interface of channel unit and an output of a application program of computer system is output to work station WS through SVP. Moreover, it is possible to input determined data and command to the application program from WS.

In more detail, it is supposed here that 16 units, for example, are connected to SVP. A particular one unit of the sixteen is used executing the intrinsic processings of SVP (e.g., fault detection and recovery, initial program loading described previously). The remaining 15 terminal units are used as the work stations to execute the processings concerning the application program. Therefore, the unit used as the SVP is connected with the interface (signal line connected directly to CPU, main storage unit and main storage control unit, etc.) for intrinsic processing and the signal line outputs data of the application program to the display screen in order to input the command concerning the application program of the computer system.

As a plurality of terminals connected to SVP, the terminals for executing the intrinsic processing of SVP (hereinafter called an SVP terminal) and the terminals for application program (hereinafter called a WS terminal) are previously determined.

A total of 16 terminals are called from No. 1 to No. 16. Of these terminals, the terminal No. 1 is determined as the SVP terminal and the terminals from No. 2 to No. 16 are chosen as the WS terminals. These assignments of the terminals cannot be changed. Namely, when data is to be transferred to the terminal No. 1 or to the terminal No. 16 from CPU of the computer system, data is transferred together with information which designates the distant or target terminal number. Each function of the terminal which is previously stored in the program is stored in the main storage unit.

Therefore, alteration of the functions stored in the program is impossible unless the program is updated.

Usually, the necessary program is loaded before starting of the computer system during the initial program loading described previously. Specifically, the nucleus initial program is loaded and it is stored in the terminal No. 1, for example, whose terminal No. 1 is the SVP terminal. Accordingly, such a determination is already made before the computer system is started.

If a hardware fault (for example, display screen, CRT (Cathode Ray Tube) or LCD (Liquid Crystal Display) fails and display becomes impossible, or if a keyboard fails or microprocessor forming the terminal fails) occurs in the SVP terminal during operation of computer system, the intrinsic processing of SVP can no longer be continued. For instance, when CPU fails and it must be started again, namely when the initial program loading must be done, if the SVP terminal is defective or experiencing a failure, the processings by the computer system cannot be executed thereafter.

The SVP terminals are often installed in the area wherein the main frame of the computer system is also installed. In the case of offices or laboratories, a computer room is prepared and CPU, main storage unit, main storage control unit, channel unit and SVP are typically installed therein. The SVP terminals are installed in the computer room. The WS terminals connected to SVP are installed in the offices and laboratories for use by operators. In general, the computer room is physically separated from offices and laboratories. Therefore, when an operator recognizes a system-down or failure of the computer during use of the WS terminal, the operator must go to the computer room and conduct initial program loading by operating the SVP terminals to re-initialize the computer. Namely, an operator must go to the computer room from his current position and thereby the initial program loading is delayed. Currently, the computer system also deals with the processings including recording, calculation and simulation of changes of stock prices. Stock prices usually change from time to time in the matter of seconds. If initial program loading is delayed, it is no longer possible to correctly continue the procesings carried out. Such use of computer system is not limited only to stock prices but is also applicable to the computer system dealing with data which changes with the time, such as weather data or data transmitted from satellites.

It is a matter of course that a similar problem is generated even if the SVP terminal fails when the computer system fails and restarting must be done, when the initial program loading must be done.

Usually the same type of terminals are often used for the SVP and WS terminals and sometimes the same hardware of terminal itself may be used for both the SVP and WS terminals. The Japanese Patent of Laid-open No. 59-173815, "Console Work Station Changeover System" discloses a structure that the interface of a work station terminal is connected with the interface of an SVP terminal with a connecting line, a switch is provided between these interfaces and the terminal is connected to this switch. These terminals are changed over or converted to the work station terminal and SVP terminal with the switch. However, this switching is considered or preferred based on the computer system which is different from the system described above. Namely, the interface of SVP is so structured as allowing connection of one SVP terminal from the beginning, the interface for the work station is provided separately and such an interface is switched for one terminal with a physical switch. However, in this method, when a terminal is used as the work station, the SVP terminal does not exist or cannot be used. Therefore, a particular one terminal is switched from the WS terminal to the SVP terminal but it is impossible to freely select the SVP terminal from a plurality of terminals. If it is required to switch a plurality of terminals, it can be done by providing a plurality of switches the amount of hardware increases remarkably. Thus, the increased hardware is a disadvantage for realization of low cost computer system. An additional problem is that the SVP terminal is not recognized by the CPU. That is, the SVP terminal is not stored in the main storage unit. Therefore, if an operator changes over the switch when CPU starts the transfer of data to SVP or WS, the data transfer cannot be carried out correctly.

The Japanese Patent of Laid-open No. 59-180734 entitled "Common Use of System Console and Work Station" discloses the switching of a particular unit as the SVP terminal or WS terminal among a plurality of terminals connected to SVP. This technique realizes that terminal which is the SVP terminal is stored in the main storage unit but the particular unit which can operate as an SVP terminal can also be used as the WS terminal. Namely, a particular terminal unit can be used as the SVP terminal or WS terminal through the switching operation but the other terminals can be used only as the WS terminals.

Therefore, it is desired that the WS terminals among a plurality of terminals connected to the SVP be used also as the SVP terminals.

SUMMARY OF THE INVENTION

In order to solve the problems described previously, it is an object of the present invention to provide a computer system comprising a main storage unit for storing at least an operating system, and a central processing unit for reading instruction of a program stored in the main storage unit and executing the predetermined processings and calculations. In addition a service processor is provided being connected to the main storage unit and central processing unit which is capable of loading programs to the main storage unit, and a plurality of terminals is also provided which include an SVP terminal and other terminals which are given previously assigned numbers and are connected with the service processor. Further, the invention includes request storing means for storing that a request is input corresponding to one of the other terminals when the request for connection to the SVP terminal is issued from the other terminal, loading a means for loading a predetermined program to load the operating system to the main storage unit, and number storing means for storing the terminal number which has issued the connection request to the predetermined program after the predetermined program is loaded.

DETAILED DESCRIPTION OF THE PREFERRED EMBODIMENTS

Figure 1:
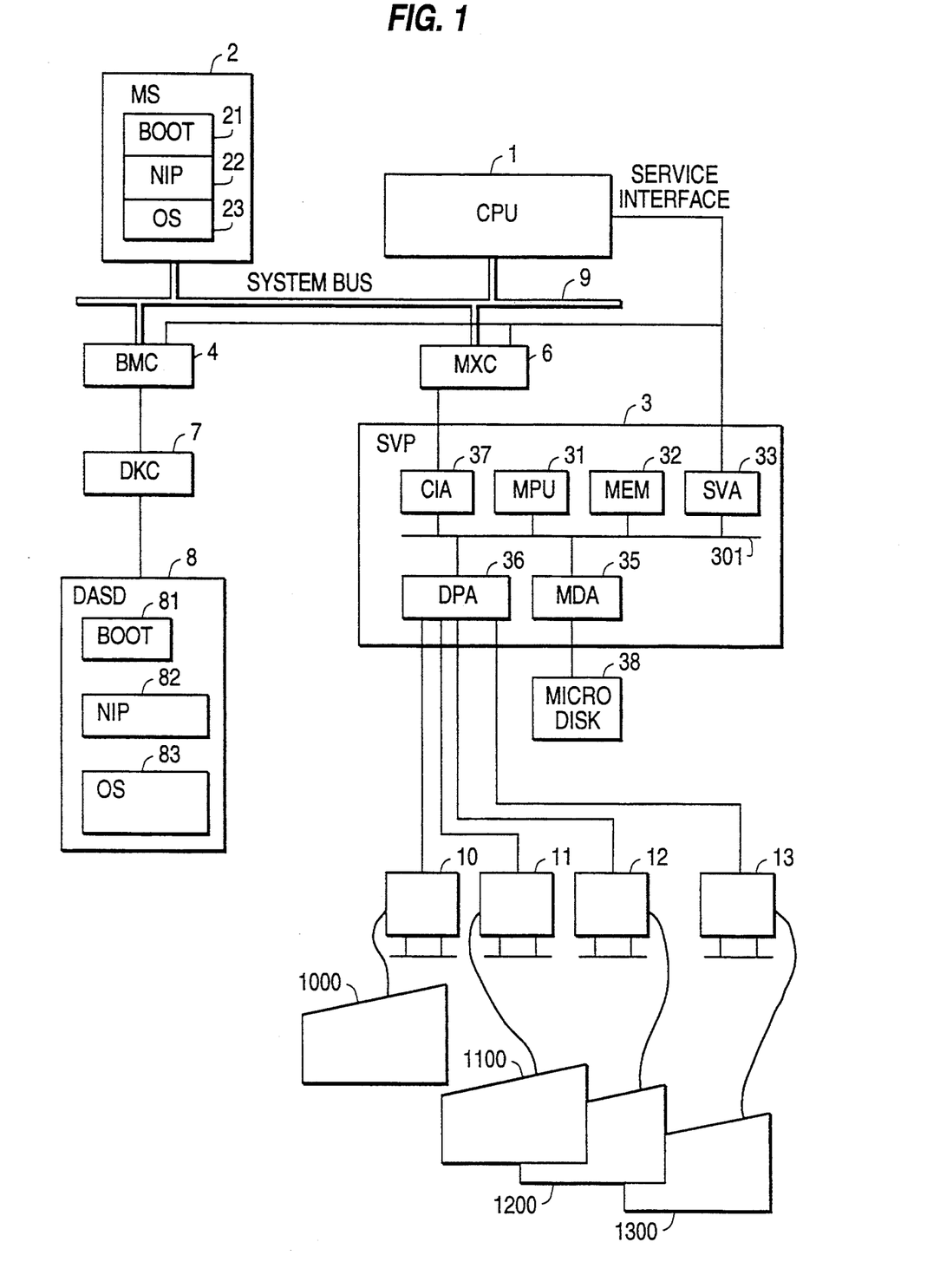
FIG. 1 is a block diagram of a computer system illustrating an embodiment of the present invention.

A computer system shown in FIG. 1 is an embodiment of the present invention having structure where a central processing unit (CPU) 1, a main storage unit (MS) 2, a block multiplexer channel (BMC) 4, a multiplexer channel (MXC) 6 are connected through a system bus 9. The main storage unit (MS) 2 stores programs required for the computer system to execute processings, including the operating system OS and application programs which operate conforming to the commands of OS. CPU 1 reads the instruction of the programs and data stored in MS 2 for calculation. BMC 4 transfers data stored in MS 2 to the controllable input-/output units connected to BMC 4 in accordance with the input/output instructions of CPU 1. Such input/output units include DASD (Direct Access Storage Device) 8. A disk controller DKC 7 is provided between BMC 4 and DASD 8 for controlling the writing and reading of data. DASD 8 is usually formed by using a hard disk.

MXC 6 is also connected with a controllable SVP 3 and well known communication control unit, printer and work stations, etc.

In the SVP 3, MPU (Main Processing Unit) 31, MEM (memory) 32, CIA (Channel Interface Adapter) 37, SVA (Service Interface Adapter) 33, DPA (Display Interface Adapter) 36, MDA (Micro Interface Adapter) are connected through the bus 301.

SVA 33 is an interface among CPU 1, BMC 4, MXC 6 and SVP 3 and is connected to them with a connecting line for collecting fault data or data indicating a system-failure.

CIA 37 is an interface between the multiplexer channel 6 and SVP 3. CPU 1 outputs commands or data to the work stations among the terminals 10~13 connected to SVP 3. Moreover, the data is also transferred back to CPU 1 from the work stations among the terminals 10~13. Each terminal 10~13 is provided with the keyboard 1000, 1100, 1200 or 1300, respectively.

MDA (Micro Disk Interface Adapter) 35 is an interface between micro disk 38 and SVP 3.

Figure 2:
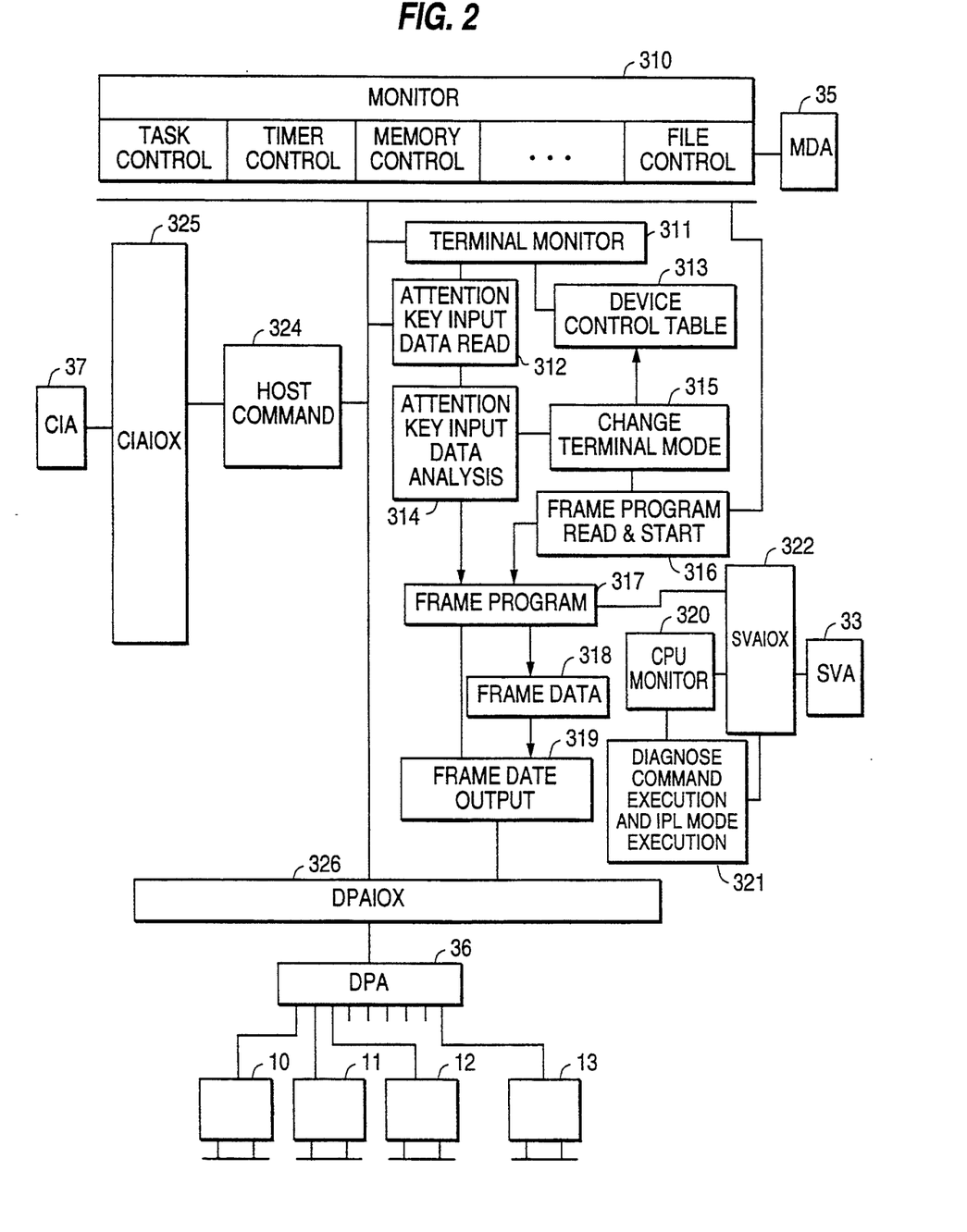
FIG. 2 is a block diagram of a program stored in the memory (MEM) of SVP memory shown in FIG. 1.

MPU 31 reads the program stored in the memory 32 of SVP 3 and executes the processing as SVP 3. The programs shown inn FIG. 2 are stored in the memory 32. In FIG. 2, reference numeral 310 is a monitor program for well known task management, timer management, memory management and file management Reference numeral 311 is a terminal monitor program for monitoring whether commands or data are output to SVP 3 from termnals 10~13 or not. Specifically, the well known process of polling terminals 10~18 is carried out. 312 is an attention key, input data read program. 314 is an attention key, input data analysis program, 315 is a change terminal mode program, 316 is a frame program read and start program, 317 is a frame program, 318 is a frame data, 319 is a frame data output program, 320 is a CPU monitor program and 321 is a diagnose command execution and read IPL (initial program loading) mode execution program. CIAIOX 325, SVAIOX 322, DPAIOX 326 are programs for respectively managing CIA 37, SVA 33 and DPA 36.

Operations of these programs are explained hereunder with reference to the accompanying drawings.

Here, it is supposed that the computer system shown in FIG. 1 has generated a system-down due to a program error in the main storage unit.

Figure 3A:
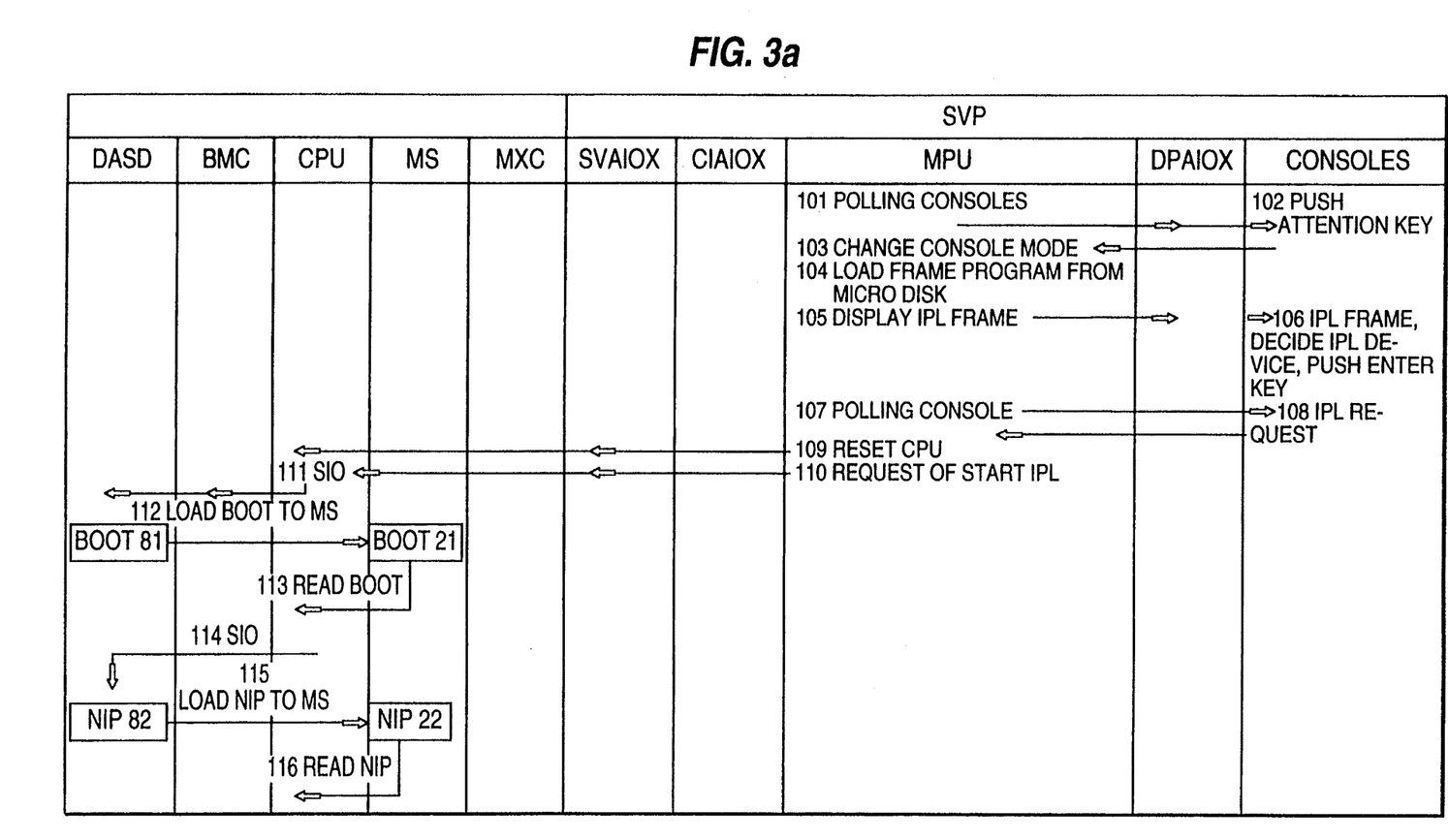
FIG. 3a and 3b together comprise for explaining the processing sequence of a program shown in FIG. 2.

In this case, the initial program loading must be done from the SVP terminal among the terminals 10~13 connected to SVP 3. Here, it is supposed that the terminal 13 is designated as the SVP terminal and is installed or located in the computer room. In this case, it is also supposed that the other terminals are designated as the WS terminals and a user of WS terminal desires to immediately make the initial program loading. Step 101 (the number added to the step hereinafter corresponds to the number given in FIG. 3a):

The terminal monitor program 311 in the memory of SVP 3 carries out the polling for the terminals 10~13.

Step 102:

It is supposed or assumed that the attention key of the key board is depressed which has been used by an operator from the terminal 10 among those terminals 10~13 connected to SVP 3.

When such attention key is depressed, it is decided by the attention key input data read program 312 that any key is depressed.

The attention key input data analysis program 314 decides that the key depressed is the attention key CPU 1 generates system down and the terminal 10 is switched to the SVP terminal from the WS terminal.

Figure 6:
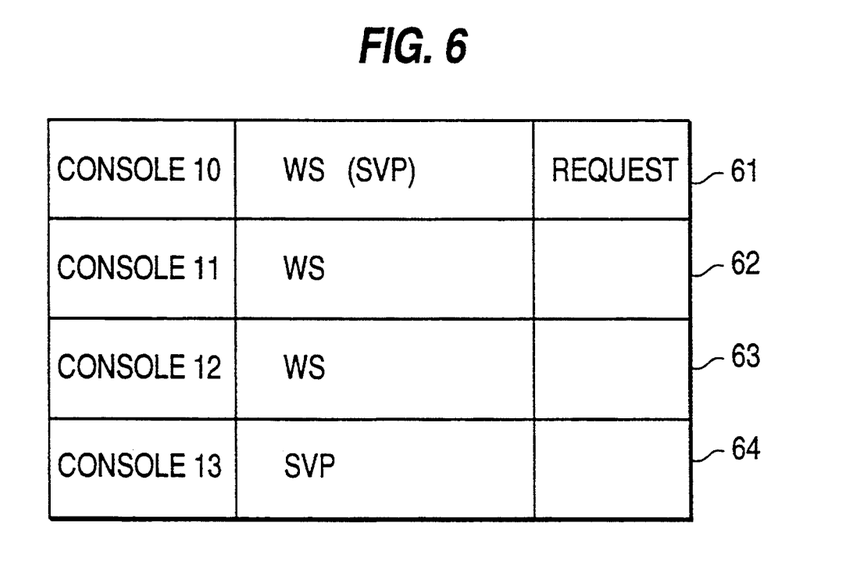
FIG. 6 is a format of device control table.

Step 103:

The change terminal mode program 315 changes the request mode stored in the device control table 313. Namely, it stores that the terminal 10 has issued a change terminal request. FIG. 6 shows a device control table. The numbers given show a terminal number from the left side indicating for which purpose the terminal is used (WS or SVP terminal). The terminal 10 indicates that it is currently used as the WS. The letters SVP in the parentheses indicate that it can be rewritten in the step 120 as described latter. It suggests that the terminal is used as the WS terminal in the current step 103. The numerals 61 to 64 indicate the tables storing whether the change terminal request is issued or not. These numerals correspond to terminal numbers and in this case, the request is stored in the terminal number 10.

Step 104:

The frame program read and start program 316 loads the frame program 317, which is the frame stored in the micro disk 38 to execute the initial program loading output to the SVP terminal, to the memory 32 from such micro disk 38. In FIG. 3a, 317 is the frame program and it is stored to the memory 32 from the micro disk 38 in this step.

Step 105:

The frame data output program 319 transfers the frame data 318 of the frame program 317 to DPAIOX 326 (a program for managing input/output processings of DPA) which outputs the frame data to the terminal 10.

Figure 4:
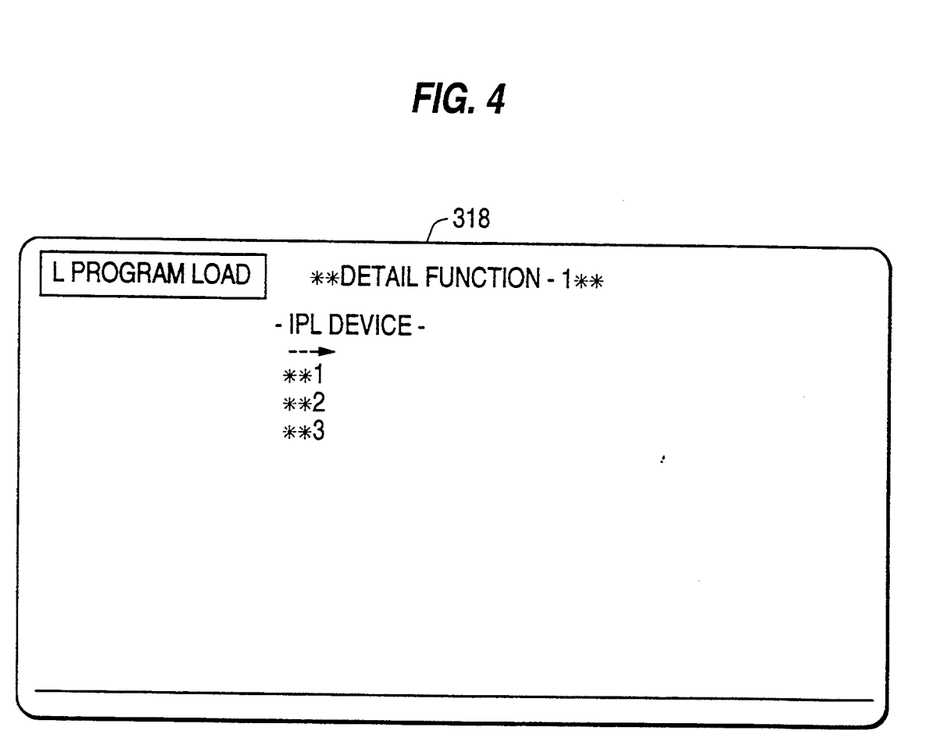
FIG. 4 is a display format output from the frame program.

Step 106:

The frame data 318 of FIG. 4 is output to the terminal 10. When such frame data is displayed on the terminal 10, the IPL device is designated. The IPL device indicates the number of external memory units storing the program to be loaded to the main storage unit 2. Here, DASD 8 is designated. The numbers such as 1, 2, 3 are selected on the frame data 318 and are designated when an operator inputs such numbers. These numbers are assigned corresponding to the predetermined input/output units. The number 1 designates DASD 8, while 2, 3 designate other input/ouptut units which are connected to BMC 4 as the controllable units. An operator designates DASD 8 on the frame data 318 and then depresses the execution key.

Step 107:

The terminal monitor program 311 in the memory 32 of SVP 3 carries out the polling to the WS terminals 10~13.

Step 108:

When the execution key is depressed, the attention key, input data read program 312 decides that any key is depressed. The attention key input data analysis program 314 decides that the data transferred is the IPL device number, and decides that the terminal 10 has designated DASD 8 for the IPL device. The attention key input data analysis program then transfers such number to the frame program 317.

Step 109:

The frame program 317 resets CPU 1 from SVA 33 through the SVAIOX program 322.

Step 110:

The IPL start request is issued to CPU 1. The frame program 317 notifies the IPL device number to CPU 1 from SVA 33 through the SVAIOX program 322.

Step 111:

Upon reception of such request and IPL device number, CPU 1 outputs the input/output start instruction to DASD 8 together with such IPL device number through the block multiplexer channel BMC 4. The input/output start instruction is automatically generated by the microprogram which executes the START IPL processing in CPU 1.

Step 112:

Upon reception of input/output start instruction, DASD 8 loads the bootstrap program 81 to the main storage unit 2 as boot strap program 21. The bootstrap program 81 is necessary for CPU 1 to read the data stored in the main storge unit 2 for data transfer. In this case, this bootstrap program 81 is loaded in order to successively load the operating system OS and application program because the data transfer cannot be executed due to system-down of the computer system.

Step 113:

CPU 1 reads the bootstrap program 21 in the main storage unit 2.

Step 114:

The input/output instruction for loading the data in DASD 8 designated by the bootstrap program 21 to the determined address of the main storage unit 2 is issued to DASD 8. In this case, data means NIP 82.

Step 115:

NIP 82 is loaded to the main storage unit 2. The format of NIP 82 is shown in FIG. 5.

Figure 5:
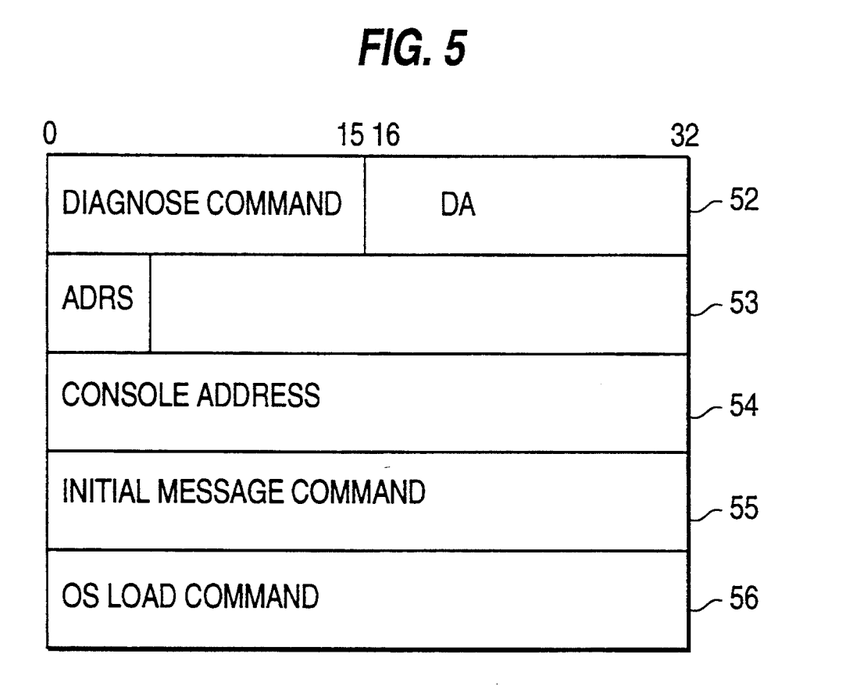
FIG. 5 is a format of NIP (Necleus Initialization Program).

Step 116:

When NIP 82 is loaded to the main storage unit 2, CPU 1 reads NIP 22 and executes instructions of NIP (FIG. 5).

Step 117 (illustrated in FIG. 3b):

When CPU 1 recognizes that the instruction executed is the read IPL diagnose instruction 52 (FIG. 5), it asks SVP 3 to read the diagnose instruction 52 (FIG. 5) in NIP 22. This request is transferred to SVP 3 through SVA 33 and SVAIOX 322.

Figure 3B:
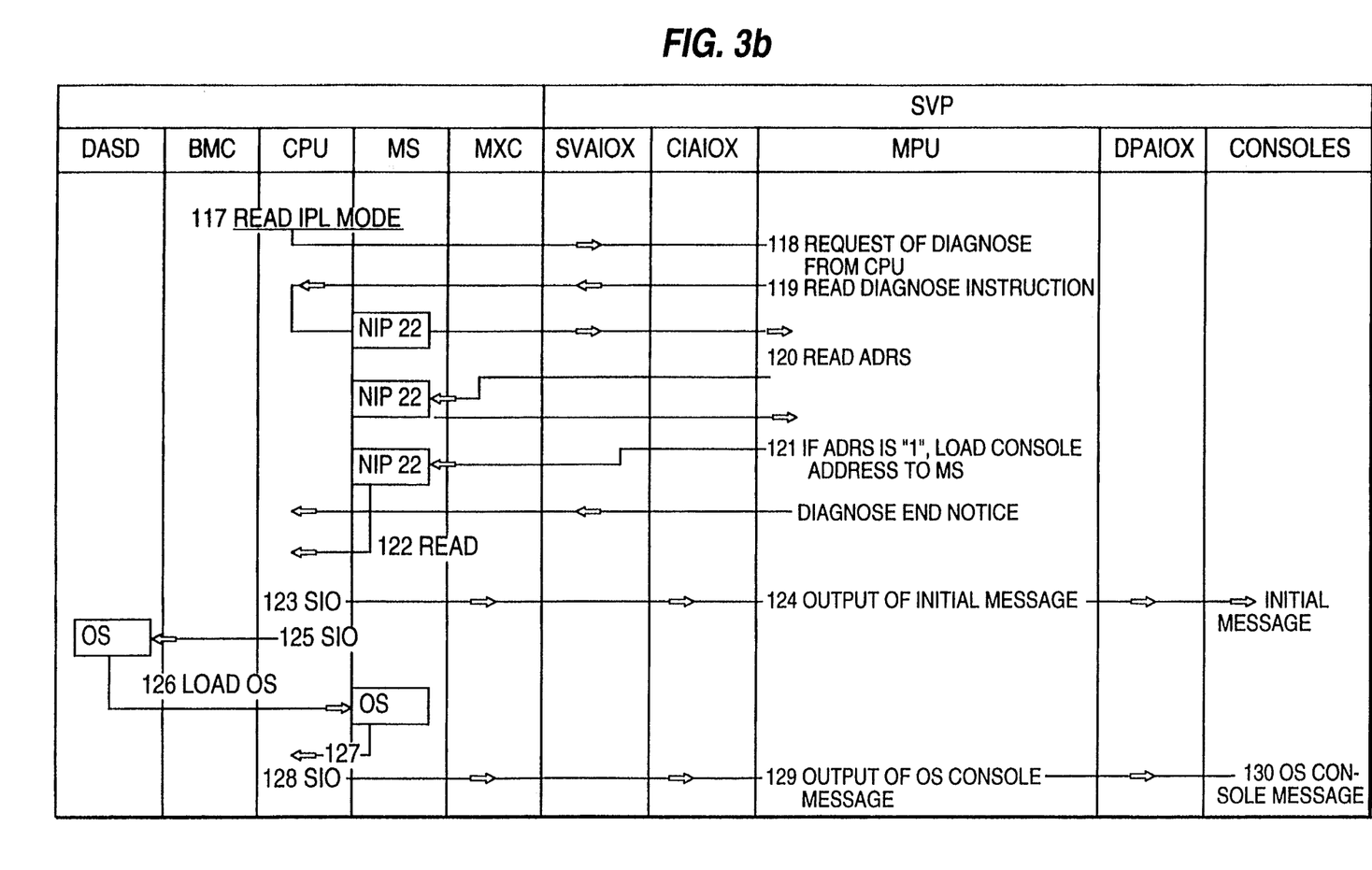

Step 118:

The CPU monitor program 320 of SVP 3 recognizes that the request is issued and notifies it to the diagnose command excution and read IPL program mode execution 321.

Step 119:

The diagnose command execution and read IPL mode execution program 321 of SVP 3 reads the diagnose instruction 52 of NIP 22 from the main storage unit 2 through SVAIOX 322 and SVA 33.

Step 120:

The diagnose instruction 52 is shown in FIG. 5. The bits 0~15 indicate the diagnose instruction 52. DA is a leading address on the main storage unit 2 storiong ADRS and terminal number in NIP. Upon reading the diagnose instruction 52, the diagnose command execution program 321 reads the data of address, namely ADRS, designated by DA. When the bit of ADRS is 0, the terminal number stored previously in NIP 82 is assigned to the SVP terminal.

Namely, ADRS 53 in FIG. 5 is preset by an operator and stored in DASD 8. When ADR 5 is 0, the SVP terminal is fixed. For instance, when ADRS 53 is 0 and the terminal number 54 stored in NIP 82 is 13, the terminal No. 13 is directly used thereafter as the SVP terminal. When ADRS is 1, if the terminal number stored in NIP 82 is 13, it is not used as the SVP terminal. When the bit is supposed as or assumed to be 1, the device control table 313 (FIG. 6) in the memory 32 of SVP 3 is read and the terminal number for which the selection request is stored to the terminal request mode is also read.

In this case, the terminal number 10 stored in the step 104 is read. Simultaneously, the terminal mode of terminal 10 is updated as the SVP terminal, invalidating the mode of terminal 13.

Step 121:

The terminal number 10 is stored in the address designated by DA+1 of diagnose instruction (namely, 54 in NIP). Namely, the terminal number 10 is stored to the address storing the terminal number 13 described previously of NIP 22. Therefore, the terminal number 10 is stored as the SVP terminal to the main storage unit 2. The CPU monitor program 320 in SVP 3 notifies completion of read IPL mode diagnose instruction in the step 117 of CPU 1 to CPU 1.

Step 122:

After the terminal number is stored, CPU 1 reads the initial message issuing instruction 55 from NIP 22.

Step 123:

CPU 1 notifies the initial message issuing instruction 55 (this instruction informs an operator of starting of loading of OS) to the host command program 324 of SVP 3 through the multiplexer channel 6 and CIA 37 of SVP 3.

Step 124:

The host command program 324 analyzes the instruction and decides that the instruction is destinated to the terminal 10 and transfers it to DPAIOX 326. DPAIOX 326 displays a message to the terminal number No. through DPA 36.

Step 125:

CPU 1 issues to DASD 8 the OS load instruction 56 (stored in NIP 22) for loading the operating system 83 to the main storage unit 2. The OS load instruction 56 stores the leading address of OS stored in DASD 8.

Step 126:

DASD 8 transfers the operating system 83 to the main storage unit 2 from the address designated by the instruction described above.

Step 127:

When the operating system 83 is loaded into the main memory, CPU 1 reads the input/output instruction for the operating system message stored in the operating system 83.

Step 128:

The input/output instruction for the operating system message (this instruction notifies that the operating system is stored in the main storage unit 2 to the SVP terminal 10 and moreover sequentially notifes the executing condition of OS to an operator) is transferred to the host command progam 324 of SVP 3 through the multiplexer channel and CIA 37 of SVP 3.

Step 129:

The host command program 324 analyses the operating system message instruction, decides that it is to be sent to the terminal 10 and transfers it to DPAIOX 326.

Step 130:

DPAIOX 326 displays the message to the terminal No. 10 through DPA 36.

Operations and structure for storing the SVP terminal number to the main storage unit 2 during the initial program loading have been described. In this explanation, the terminal number chosen was No. 10, but the number is not limited to No. 10 and it can be selected to any number desired in the present invention.

While the present invention has been described with respect to a specific embodiment thereof, it is to be understood that the present invention is not limited thereto in any way but covers any and all changes and modifications which will become possible within the scope of the claims described hereafter.

What is claimed is:

1. A computer system having hardware, comprising:
   a main storage unit for storing an operating system and an application program,
   a central processing unit connected to said main storage unit, reading instructions of the application program stored in said main storage unit and executing predetermined processing and calculations,
   a service processor, connected to said main storage unit and said central processing unit, to load the application program into said main storage unit,
   a plurality of terminals each having assigned numbers and connected to said service processor, each of said plurality of terminals operable as a service processor terminal for reinitializing and controlling the hardware of the computer system and as a work station,
   request storing means, operatively connected to said plurality of terminals, located in said service processor for storing a console indication indicating which of said terminals is the service processor terminal and a request indication indicating receipt of a request for connection to the service processor from one of said plurality of terminals, requesting use as the service processor terminal loading means operatively connected to said main storage unit, for storing and loading a second program used to load the operating system to said main storage unit responsive to the request for connection issued by the one of said plurality of terminals, and number storing means, operatively connected to said loading means and said request storing means, for storing in said main storage unit, after the second program is loaded by said loading means, a terminal number identifying the one of said plurality of terminals in dependence upon the request indication.

2. A computer system having hardware, comprising:

a main storage unit for storing an operating system, an initial program and a terminal designation program designating a service processor terminal number and validity designation information, a central processing unit connected to said main storage unit, reading instructions of the initial program stored in said main storage unit, and executing predetermined processing and calculations, a service processor, connected to said main storage unit and said central processing unit to load the initial program into the main storage unit, a plurality of terminals each having assigned numbers and connected to said service processor, each of said plurality of terminals operable as the service processor terminal for reinitializing and controlling the hardware of the computer system by generating a terminal connection request and as a work station request storing means, operatively connected to said plurality of terminals, for storing the terminal connection request received from one of said plurality of terminals, loading means, operatively connected to said main storage unit, for storing and loading the terminal designation program into said main storage unit responsive to the initial program and the terminal connection request issued by the one of said plurality of terminals, reading means, operatively connected to said main storage unit and located in said service processor for reading the validity designation information in said main storage unit after said terminal designation program is loaded by said loading means, and number storing means, operatively connected to said loading means and said request storing means, for storing in said main storage unit for use by the terminal designation program loaded by said loading means, a new terminal number identifying the one of the plurality of terminals as the service processor terminal when the validity designation information has been previously set to indicate that the service processor terminal number may be changed by said number storing means.

3. A computer system according to claim 2, wherein after the new terminal number is stored in said main storage unit for use by the terminal designation program, the terminal designation program stores the operating system in said main storage unit.

4. A computer system according to claim 3, wherein said loading means comprises an external storage unit connected to said main storage unit storing the terminal designation program and the operating system executed by said central processing unit after loading in said main storage unit.

5. A computer system having hardware, comprising:

a main storage unit for storing an operating system, a first initialization program and an application program, a central processing unit connected to said main storage unit, reading instructions of the first initialization program stored in said main storage unit and executing predetermined processing and calculations, a service processor connected to said main storage unit and said central processing unit, to load programs into said main storage unit, a plurality of terminals, each assigned a terminal number and connected to said service processor, any of said plurality of terminals being usable as a work station for processing the application program and as a service processor terminal for reinitializing and controlling the hardware of said computer system, request storing means, operatively connected to said plurality of terminals, located in said service processor for storing a console indication indicating which of said terminals is the service processor terminal and a request indication indicating receipt of a request for connection to the service processor from one of said plurality of terminals, requesting use as the service processor terminal loading means located in said service processor and operatively connected to said main storage unit, for storing and loading a second initialization program used to load the operating system to said main storage unit responsive to the request for connection issued by the one of said plurality of terminals, and number storing means, operatively connected to said loading means and said request storing means, for storing in said main storage unit, after the second initialization program is loaded by said loading means, a terminal number identifying the one of said plurality of terminals in dependence upon the request indication.

6. A computer system having hardware, comprising:

a main storage unit for storing an operating system, an initial program, a terminal designation program designating a service processor terminal number and validity designation information ,and an application program, a central processing unit connected to said main storage unit, reading instructions of the initial program stored in said main storage unit and executing predetermined processings and calculations, a service processor connected to said main storage unit and the central processing unit, to load programs into said main storage unit a plurality of terminals each assigned a terminal number and connected to said service processor, any of said plurality of terminals being usable as a work station for processing the application program and as a service processor terminal for reinitializing and controlling the hardware of said computer system, request storing means located in said service processor and operatively connected to said plurality of terminals, for storing a console indication indicating which of said terminals is the service processor terminal and a request indication indicating receipt of a request for connection to the service processor from one of said plurality of terminals, requesting use as the service processor terminal, loading means, operatively connected to said main storage unit, for storing and loading the terminal designation program into said main storage unit responsive to the request for connection issued by the one of said plurality of terminals, reading means located in said service processor and operatively connected to said main storage unit, for reading the validity designation information stored in said main storage unit after the terminal designation program is loaded by said loading means, and number storing means, operatively connected to said loading means and said request storing means, for storing in said main storage unit for use by the terminal designation program, a new terminal number identifying the one of the plurality of terminals to indicate that the terminal connection request was input and corresponds to the one of said plurality of terminals when the validity designation information has been previously set to indicate that the service processor terminal number may be changed by said number storing means.

7. A computer system according to claim 6, wherein after the new terminal number is stored in said main storage for use by the terminal designation program, the terminal designation program stores the operating system in said main storage unit.

8. A computer system according to claim 7, wherein said loading means comprises an external storage unit connected to said main storage unit storing the terminal designation program and the operating system executed by said central processing unit after loading in said main storage unit.

9. A computer system having hardware, comprising:
a main storage unit for storing an operating system and an application program, a central processing unit connected to said main storage unit, reading instructions of the application program stored in said main storage unit and executing predetermined processing and calculations, a service processor connected to said main storage unit and said central processing unit, to load programs into said main storage unit, a plurality of terminals, each assigned a terminal number and connected to said service processor, any of said plurality of terminals being usable as a work station for processing the application program and as a service processor terminal for reinitializing and controlling the hardware of said computer system, request storing means located in said service processor and operatively connected to said plurality of terminals, for storing a console indication indicating which of said terminals is the service processor terminal and a request indication indicating receipt of a request for connection to the service processor from one of said plurality of terminals requesting use as the service processor terminal, loading means, operatively connected to said main storage unit, for storing and loading the operating system into said main storage unit responsive to the request for connection issued by the one of said plurality of terminals, and number storing means located in said service processor and operatively connected to said loading means and said request storing means, for storing, after the operating system is loaded into said main storage unit by said loading means, a terminal number identifying the one of said plurality of terminals which issued the connection request to the operating system.

10. A computer system having hardware, comprising:
a main storage unit for storing an operating system and an application program, a central processing unit connected to said main storage unit, reading instructions of the application program stored in said main storage unit and executing predetermined processing and calculations, a service processor connected to said main storage unit and said central processing unit, to load programs into said main storage unit, a plurality of terminals each assigned a terminal number and connected to said service processor, any of said plurality of terminals being usable as a work station for processing the application program and as a service processor terminal for reinitializing and controlling the hardware of said computer system, request storing means located in said service processor and operatively connected to said plurality of terminals, for storing a console indication indicating which of said terminals is the service processor terminal and a request indication indicating receipt of a terminal connection request to said service processor from one of said plurality of terminals requesting use as the service processor terminal, loading means, operatively connected to said main storage unit, for storing and loading the operating system into said main storage unit, reading means located in said service processor and operatively connected to said main storage unit, for reading validity designation information, stored in the operating system, including the terminal number of the service processor terminal after the operating system is loaded into said main storage unit, and number storing means, operatively connected to said loading means and said request storing means, for storing, in said main storage unit for the terminal designation program, the terminal number identifying the one of said plurality of terminals which issued the terminal connection request when the validity designation information has been previously set to indicate that the service processor terminal number may be changed by said number storing means.

11. A computer system according to claim 10, wherein said loading means comprises an external storage unit connected to said main storage unit storing at least the terminal designation program and the operating system used by said central processing unit after loading in said main storage unit.

* * * * *

UNITED STATES PATENT AND TRADEMARK OFFICE
CERTIFICATE OF CORRECTION

PATENT NO. : 5,339,450
DATED : August 16, 1994
INVENTOR(S) : Toyokazu NAGAHARA

It is certified that error appears in the above-indentified patent and that said Letters Patent is hereby corrected as shown below:

Title page, Abstract, line 5, change "excuting" to

--executing--;

line 12, change "purality" to

--plurality--;

line 15, change "terminal" to

--terminals--, after "issues" insert --a--, and delete "pro-";

line 16, change "cess" to

--processor--.

Column 1, line 11, after "to" insert --a--;

line 31, change "of" to --the--;

line 50, delete "a" and after "of"

(second occurrence) insert --a--.

UNITED STATES PATENT AND TRADEMARK OFFICE
CERTIFICATE OF CORRECTION

PATENT NO. : 5,339,450
DATED : August 16, 1994
INVENTOR(S) : Toyokazu NAGAHARA

It is certified that error appears in the above-indentified patent and that said Letters Patent is hereby corrected as shown below:

Column 3, line 26, after a"switches" insert --but--;

line 39, delete "SVP" and replace with --the particular unit which can be an SVP or WS terminal--;

line 56, change "instruction" to --instructions--;

line 58, change "addition" to --addition,--.

Column 4, line 13, change "FIG." to --FIGS.--, and after "comprise", insert --a diagram;--;

UNITED STATES PATENT AND TRADEMARK OFFICE
CERTIFICATE OF CORRECTION

PATENT NO. : 5,339,450
DATED : August 16, 1994
INVENTOR(S) : Toyokazu NAGAHARA

It is certified that error appears in the above-indentified patent and that said Letters Patent is hereby corrected as shown below:

line 17, change "(Necleus" to

--(Nucleus--;

line 24, after "having" insert --a--;

line 32, change "instruction" to

--instructions--;

line 65, change "inn" to --in--;

line 68, change "management"

to --management.--.

Column 5, line 3, change "termnals" to

--terminals--;

line 54, change "latter" to --later--;

UNITED STATES PATENT AND TRADEMARK OFFICE
CERTIFICATE OF CORRECTION

PATENT NO. : 5,339,450
DATED : August 16, 1994
INVENTOR(S) : Toyokazu NAGAHARA

It is certified that error appears in the above-indentified patent and that said Letters Patent is hereby corrected as shown below:

```
             line 59, after "the" insert --table location corresponding to--;

line 41, change "CPU" to

--CPU,--

Column 6, line 27, delete ",";

line 54, change "storge" to

--storage--.

Column 7, line 16, change "excution"

to --execution--, and after

"IPL" insert --mode execution--; and
```

UNITED STATES PATENT AND TRADEMARK OFFICE
CERTIFICATE OF CORRECTION

PATENT NO. : 5,339,450  Page 5 of 6
DATED : August 16, 1994
INVENTOR(S) : Toyokazu NAGAHARA It is certified that error appears in the above-indentified patent and that said Letters Patent is hereby corrected as shown below:

line 26, change "on" to --of--, and            change "storiong" to --storing--;

line 27, after "and" insert --the--;

line 34, change "ADR5" to --ADRS5--;

line 46, change "104" to --103--.

Column 8,   line 2, after "that" insert --the destination of--, and delete            "destinated to";

line 4, delete "No." and replace with            --10--;

line 24, change "notifes" to --notifies--;

line 39, delete "selected to".

UNITED STATES PATENT AND TRADEMARK OFFICE
CERTIFICATE OF CORRECTION

PATENT NO. : 5,339,450

DATED : August 16, 1994

INVENTOR(S) : Toyokazu NAGAHARA

It is certified that error appears in the above-indentified patent and that said Letters Patent is hereby corrected as shown below:

Column 9, line 27, change "unit" (second occurrence) to --unit,--;

line 35, change "station" to --station,--.

Column 10, line 48, change "information , and" to --information, and--.

Signed and Sealed this

Twenty-first Day of February, 1995

Attest:

BRUCE LEHMAN

Attesting Officer

Commissioner of Patents and Trademarks